May 24, 1949.   J. C. WEBER   2,471,364
HAY STACKER
Filed July 14, 1947
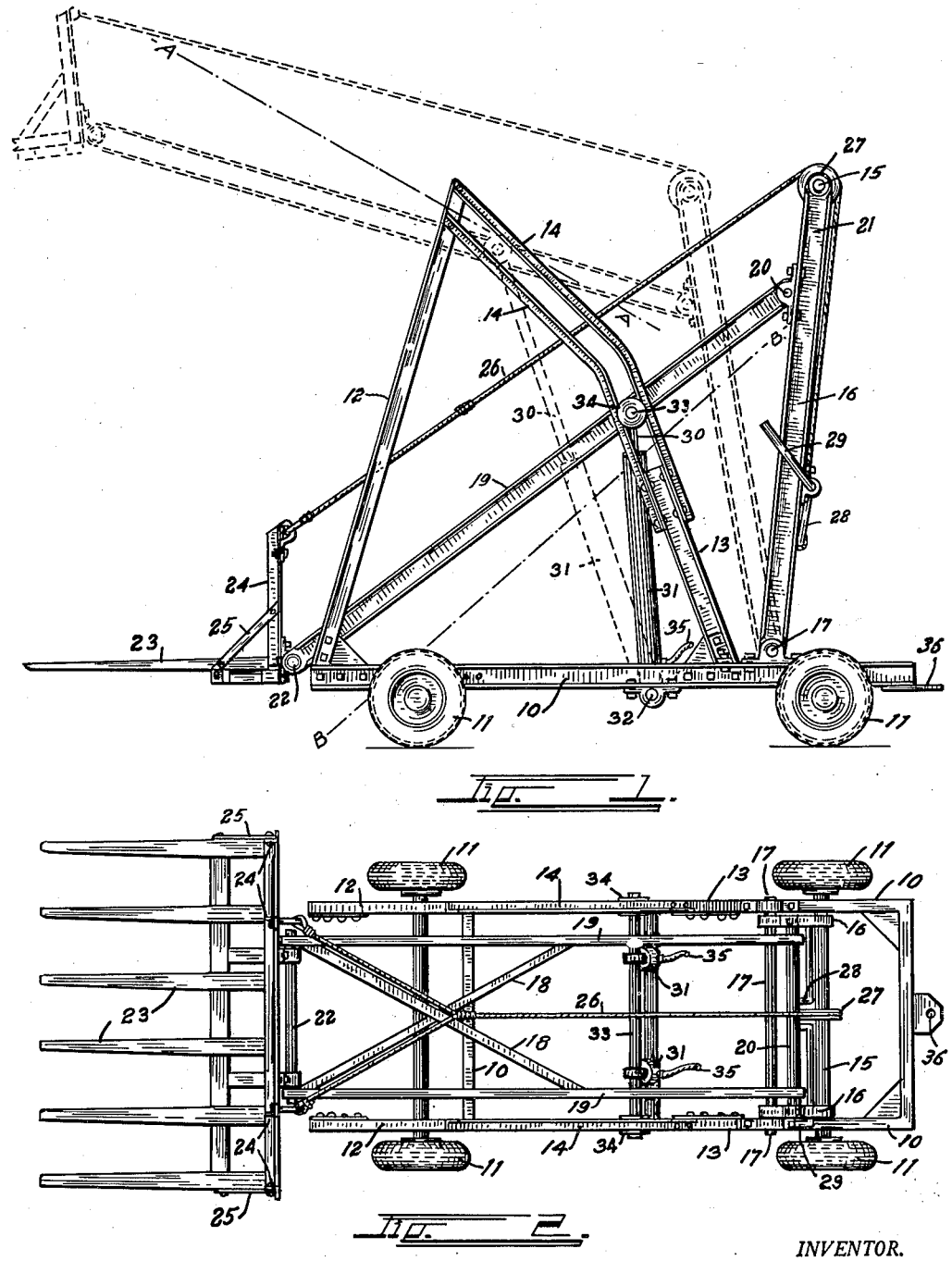
INVENTOR.
JONAH C. WEBER.
BY
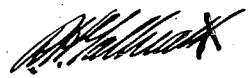
ATTORNEY.

UNITED STATES PATENT OFFICE 2,471,364

HAY STACKER

Jonah C. Weber, Lamar, Colo.

Application July 14, 1947, Serial No. 760,739

3 Claims. (Cl. 214—139)

This invention relates to a stacking or loading machine, and has for its principal object the provision of an exceedingly simple mechanism which will elevate a load on a rake or shovel to relatively high positions and automatically move the load forward during the raising act so that it may be readily dumped onto a stack or into a truck.

Many devices have been developed for swinging a load forwardly as it elevates. With such devices, the forward movement of the load at the beginning of the lift interferes with operation close to the side of a stack or truck.

Another object of this invention is to so construct the device that the forward movement of the load will be relatively greater toward the top of the lift than at the bottom so that it will clear the receiving stack or truck.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation of the improved stacking or loading mechanism mounted upon a portable trailer or truck; and Fig. 2 is a top view thereof.

The invention is more particularly designed for use in stacking hay. It is, however, not limited to this particular use, for it could be provided with a shovel in place of the stacking rake and used for loading any desired materials, either onto a pile or onto a truck or vehicle.

As illustrated, the invention is mounted upon a supporting chassis 10 carried upon suitable wheels 11. It comprises two upright, A-shaped frames arising from the side members of the chassis 10. Each A-frame consists of a rearwardly inclined front leg 12 and a forwardly inclined back leg 13. The upper portion of the back leg 13 is formed from two spaced-apart track members 14. The track members 14 are in parallel relation and extend first upward in alignment with the back leg 13, thence bend forwardly at a more gradual incline to a connection with the upper extremity of the front leg 12.

A swinging boom 16 is hingedly mounted on the extremities of a cross shaft 17 mounted on the chassis 10. The boom consists of two vertical, parallel side members between the upper extremities of which a sheave shaft 15 extends. A pair of rake arms 19 is mounted upon a hinge shaft 20 upon each of the swinging booms 16. The rake arms 19 are rigidly secured together in parallel relation by means of suitable diagonal braces 18. The hinge shaft 20 is positioned closer to the upper extremities of the booms 16 than the lower extremities thereof so as to leave portions of the booms extending upwardly therefrom, as indicated at 21.

The forward extremities of the rake arms 19 are connected by means of a horizontal rake shaft 22, upon which a suitable rake or shovel 23 is tiltably mounted. Struts 24 extend rigidly at right angles to the plane of the rake 23, preferably braced therefrom by means of angle braces 25, and form a back therein.

A flexible cable 26 extends from the struts 24 upwardly and rearwardly over a cable sheave 27 on the sheave shaft 15; thence downwardly to a termination on the crank of a crank shaft 28, which is swingingly mounted across the booms 16, and which may be swung by means of an operating handle 29.

The rake arms 19 are raised and lowered by means of hydraulic plungers 30 which extend into hydraulic cylinders 31 which are hingedly mounted on a cylinder shaft 32 extending across the bottom of the chassis frame 10. The upper extremities of the plungers 30 are attached to a roller shaft 33 which extends entirely across both rake arms 19 and terminates in grooved rollers 34 which travel along the track members 14.

Hydraulic pressure for operating the plungers 30 can be supplied through suitable conduits 35 from any suitable source. The chassis 10 can be provided with power or can be attached to a trailer or truck by means of a suitable draw bar connection 36.

In use, the chassis 10 is forced forwardly to force the rake or shovel 23 beneath the load to be lifted. Pressure is then applied to the hydraulic cylinders 31, causing them to elevate the roller shaft 33. This causes the rollers 34 to travel upward along the track members 14, first with a gradual forward movement, and thence with a more rapid forward movement as the more gradual incline of the tracks is encountered.

This forward movement of the roller shaft 33 causes the swinging booms to move forwardly as shown in broken line in Fig. 1, resulting in elevating the rake 23 about the hinge shafts 20, and in swinging the rake 23 forwardly about the cross shaft 17. The extreme upward angle of the rake arms 19 is indicated by line A—A, in Fig. 1 and the extreme downward position is indicated by the line B—B, therein.

It is preferred to have the projecting portions 21 of the booms 16 substantially equal in length to the length of the struts 24, and the length of the cable 26 is such that the struts 24 are substantially parallel to the portions 21 when the rake is in the position B—B. This parallel relation is substantially maintained throughout the full elevation of the rake 23 so that the rake maintains its level position to the height of the full lift.

The load is dumped by swinging the operating lever 29 forwardly to bring the crank 28 past its dead center position so that it may snap upwardly to allow the cables 26 to move forwardly so as to lower the front of the rake and allow the load to slide therefrom.

The two principal advantages obtained by this improved construction are the upward and automatic forward movement of the rake and the maintaining of the rake substantially level throughout its lift.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A stacker and loader comprising: a wheeled frame; A-shaped frame rising vertically from each side of said wheeled frame; a front leg in each A-frame; a back leg in each A-frame; a parallel track member forming the upper extremity of each back leg; a pair of swinging booms hingedly mounted on said wheeled frame rearwardly of said A-frames and extending upwardly; rake arms hingedly mounted at their rearward extremities on said swinging booms and extending normally forward and downward therefrom; a rake device carried on the forward extremities of said rake arms; rollers carried by said rake arms intermediate their extremites and traveling in said track members; means for raising and lowering said rake arms; rigid projecting portions on said swinging booms extending above the hinge mountings of said rake arms; a cable sheave carried at the upper extremities of said projecting portions; a strut extending upwardly from said rake member, said strut being substantially equal in length to said projecting portions; a flexible member extending from the upper extremity of said strut over said cable sheave; and releasable means attaching the rearward extremities of said flexible cables to said swinging boom.

2. A hay stacker and loader comprising: a wheeled chassis; a front leg member secured to each side of said chassis adjacent the front thereof and extending upwardly and rearwardly; a back leg member secured to each side of said chassis adjacent the rear thereof and extending upwardly and forwardly; two parallel, spaced-apart track members secured to the upper extremity of each back leg member and extending first upward in alignment with said back leg members, thence being bent forwardly at a more gradual incline to a connection with one of said front leg members; a laterally extending cross shaft supported by said chassis, rearwardly adjacent said back leg members; two side boom members mounted on said shaft and extending upwardly therefrom in parallel relation; a horizontal sheave shaft extending between the upper extremities of said side boom members; a hinge shaft extending between said side boom members below the upper extremities thereof; a pair of parallel rake arms hingedly mounted on said hinge shaft at their rear extremities and extending forwardly therefrom between said legs; a horizontal rake shaft connecting the forward extremities of said rake arms; a tilting rake mounted on said rake shaft; a roller shaft mounted on and extending across and beyond both rake arms between the track members at each side thereof; a roller on each extremity of said roller shaft positioned between the track members at that extremity; and means for raising and lowering said roller shaft to cause said rake arms to swing simultaneously upwardly and forwardly under the influence of the engagement of said rollers with said inclined track members.

3. A hay stacker and loader comprising: a wheeled chassis; a front leg member secured to each side of said chassis adjacent the front thereof and extending upwardly and rearwardly; a back leg member secured to each side of said chassis adjacent the rear thereof and extending upwardly and forwardly; two parallel, spaced-apart track members secured to the upper extremity of each back leg member and extending first upward in alignment with said back leg members; thence being bent forwardly at a more gradual incline to a connection with one of said front leg members; a laterally extending cross shaft supported by said chassis, rearwardly adjacent said back leg members; two side boom members mounted on said shaft and extending upwardly therefrom in parallel relation; a horizontal sheave shaft extending between the upper extremities of said side boom members; a hinge shaft extending between said side boom members below the upper extremities thereof; a pair of parallel rake arms hingedly mounted on said hinge shaft at their rear extremities and extending forwardly therefrom between said legs; a horizontal rake shaft connecting the forward extremities of said rake arms; a tilting rake mounted on said rake shaft; a roller shaft mounted on and extending across and beyond both rake arms between the track members at each side thereof; a roller on each extremity of said roller shaft positioned between the track members at that extremity; a cylinder shaft extending across said chassis below said roller shaft and adjacent said back leg members; hydraulic cylinders tiltably mounted on said cylinder shaft; and hydraulic plungers extending from said cylinders to said roller shaft for lifting the latter to cause said rollers to travel along said track members to project said rake upwardly and forwardly.

JONAH C. WEBER.

REFERENCES CITED

The following references are of record in the file of this patent:

UNITED STATES PATENTS

| Number | Name | Date |
|---|---|---|
| 2,190,061 | Fisher et al. | Feb. 13, 1940 |
| 2,317,075 | McFarland | Apr. 20, 1943 |
| 2,345,620 | Mork | Apr. 4, 1944 |
| 2,391,538 | Armstrong | Dec. 25, 1945 |